(12) United States Patent
Walli et al.

(10) Patent No.: US 12,322,192 B2
(45) Date of Patent: *Jun. 3, 2025

(54) SYSTEMS AND METHODS FOR VEHICLE DATA COLLECTION BY IMAGE ANALYSIS

(71) Applicant: Geotab Inc., Oakville (CA)

(72) Inventors: Thomas Arthur Walli, Hamilton (CA); William John Ballantyne, Aurora (CA); Javed Siddique, York (CA); Amir Antoun Renne Sayegh, Hamilton (CA)

(73) Assignee: Geotab Inc., Oakville (CA)

( * ) Notice: Subject to any disclaimer, the term of this patent is extended or adjusted under 35 U.S.C. 154(b) by 252 days.

This patent is subject to a terminal disclaimer.

(21) Appl. No.: 17/205,908

(22) Filed: Mar. 18, 2021

(65) Prior Publication Data
US 2022/0300747 A1  Sep. 22, 2022

Related U.S. Application Data

(60) Provisional application No. 63/162,295, filed on Mar. 17, 2021.

(51) Int. Cl.
*G06V 20/59* (2022.01)
*B60R 11/00* (2006.01)
*B60R 11/04* (2006.01)
*G06F 18/20* (2023.01)
*G06V 10/20* (2022.01)
*G06V 10/40* (2022.01)
*H04N 7/18* (2006.01)

(52) U.S. Cl.
CPC .............. *G06V 20/59* (2022.01); *B60R 11/04* (2013.01); *G06F 18/285* (2023.01); *G06V 10/255* (2022.01); *G06V 10/40* (2022.01); *H04N 7/188* (2013.01); *B60R 2011/0003* (2013.01); *B60R 2300/30* (2013.01); *G06V 2201/02* (2022.01)

(58) Field of Classification Search
None
See application file for complete search history.

(56) References Cited

U.S. PATENT DOCUMENTS

| | | |
|---|---|---|
| 7,505,841 B2 | 3/2009 | Sun et al. |
| 7,676,087 B2 | 3/2010 | Dhua et al. |
| 9,405,970 B2 | 8/2016 | Israel et al. |
| 10,015,462 B1 | 7/2018 | Quach |

(Continued)

FOREIGN PATENT DOCUMENTS

JP  2005338401 A  12/2005

OTHER PUBLICATIONS

*U.S. Appl. No. 17/205,961, filed Mar. 18, 2021, Walli et al.
(Continued)

*Primary Examiner* — Xiaolan Xu
(74) *Attorney, Agent, or Firm* — Wolf, Greenfield & Sacks, P.C.

(57) ABSTRACT

Systems and methods for vehicle data collection by image analysis are provided. An example method involves positioning a camera in a vehicle to be pointed toward a field of interest in the vehicle, capturing an image of the field of interest with the camera, identifying a region of interest in the image that is expected to convey vehicle information, and running an image processing model over the region of interest to extract vehicle information from the image.

20 Claims, 7 Drawing Sheets

(56) References Cited

U.S. PATENT DOCUMENTS

| | | | |
|---|---|---|---|
| 10,276,212 | B2 | 4/2019 | Richardson |
| 10,728,420 | B2 | 7/2020 | Popa |
| 10,997,434 | B2 | 5/2021 | Kurian et al. |
| 11,157,723 | B1 | 10/2021 | Shah et al. |
| 11,336,867 | B2 | 5/2022 | Meier et al. |
| 11,452,062 | B1 | 9/2022 | Fisher |
| 11,468,687 | B2 | 10/2022 | Takami et al. |
| 11,683,579 | B1 | 6/2023 | Symons et al. |
| 11,758,096 | B2 | 9/2023 | Shah et al. |
| 11,989,001 | B1 | 5/2024 | ElHattab et al. |
| 2003/0138146 | A1 | 7/2003 | Johnson |
| 2010/0007740 | A1* | 1/2010 | Greiffenhagen ............ G08B 13/19608 348/169 |
| 2010/0214130 | A1* | 8/2010 | Weinmann ............ G01C 23/00 382/104 |
| 2010/0299021 | A1 | 11/2010 | Jalili |
| 2011/0320683 | A1 | 12/2011 | Ueki |
| 2013/0282925 | A1 | 10/2013 | Cawse |
| 2014/0133706 | A1 | 5/2014 | Conradt |
| 2014/0294242 | A1* | 10/2014 | Conradt ............ G06F 18/24 382/104 |
| 2016/0343145 | A1 | 11/2016 | Israel et al. |
| 2017/0315523 | A1 | 11/2017 | Cross |
| 2018/0009445 | A1 | 1/2018 | Nishi |
| 2018/0211122 | A1* | 7/2018 | Amico ............ B60K 37/00 |
| 2018/0232639 | A1 | 8/2018 | Lin |
| 2018/0260737 | A1 | 9/2018 | Tanaka |
| 2018/0373980 | A1 | 12/2018 | Huval |
| 2019/0007433 | A1 | 1/2019 | Mclane |
| 2021/0081754 | A1 | 3/2021 | Frolova et al. |
| 2021/0192215 | A1 | 6/2021 | Mungo |
| 2021/0229673 | A1 | 7/2021 | Singh et al. |
| 2022/0028186 | A1 | 1/2022 | Leadbeater |
| 2022/0180647 | A1 | 6/2022 | Al-Husseini |
| 2022/0292349 | A1 | 9/2022 | Stoll et al. |
| 2022/0300759 | A1 | 9/2022 | Walli et al. |
| 2022/0301322 | A1 | 9/2022 | Walli et al. |
| 2023/0118500 | A1* | 4/2023 | Shapiro ............ G06Q 10/101 353/69 |

OTHER PUBLICATIONS

Walli et al., Systems and methods for vehicle data collection by image analysis. Co-pending U.S. Appl. No. 17/553,264, filed Dec. 16, 2021.

Walli et al., Systems and methods for training image processing models for vehicle data collection. Co-pending U.S. Appl. No. 17/205,961, filed Mar. 18, 2021.

*U.S. Appl. No. 17/553,264, filed Dec. 16, 2021, Walli et al.

Extended European Search Report for European Application No. 22158437.8, dated Aug. 12, 2022.

Extended European Search Report for European Application No. 22159869.1, dated Aug. 12, 2022.

Extended European Search Report for European Application No. 22159619.0, dated Aug. 18, 2022.

* cited by examiner

SYSTEMS AND METHODS FOR VEHICLE DATA COLLECTION BY IMAGE ANALYSIS

RELATED APPLICATIONS

This application claims the benefit under 35 U.S.C. § 119(e) to U.S. provisional Application Ser. No. 63/162,295, titled "SYSTEMS AND METHODS FOR VEHICLE DATA COLLECTION BY IMAGE ANALYSIS", filed on Mar. 17, 2021, which is herein incorporated by reference in its entirety.

FIELD

The present disclosure relates to telematics, and in particular to the collection of data from vehicles by telematics systems.

BACKGROUND

In the field of telematics, the location of a vehicle and other data pertaining to the vehicle may be monitored by a telematics system. The telematics system may be in the form of a device placed onboard the vehicle, or a system integrated within the vehicle itself, in communication with a remote data collection system. The location of the vehicle may be tracked through the use of a satellite navigation system, such as a Global Positioning System (GPS), Global Navigation Satellite System (GNSS), cellular tower network, or another system. Additional data may be collected through sensors (e.g., accelerometers, temperature sensors), or by decoding data messages received from Electronic Control Units (ECUs) of the vehicle. If available, ECUs may provide information about the operating status of the vehicle, such as engine speed, battery temperature, fuel level, tire pressure, odometer reading, and other data. Such data may be made available over a Controller Area Network (CAN) bus, through a communication port (e.g., an OBD2 port), and/or by direct connection to systems onboard the vehicle. In any case, such data may be transmitted to, and recorded at, a vehicle data collection system to be used in the provision of a telematics service, such as a fleet management tool, or for further analysis.

SUMMARY

According to an aspect of the disclosure, an example method for vehicle data collection is provided. The method involves positioning a camera in a vehicle to be pointed toward a field of interest in the vehicle, capturing an image of the field of interest with the camera, identifying a region of interest in the image that is expected to convey vehicle information, and running an image processing model over the region of interest to extract vehicle information from the image.

According to another aspect of the disclosure, an example system for vehicle data collection is provided. The system includes a camera, positioned in a vehicle, to capture an image of a field of interest in the vehicle, an image processing unit, at the vehicle and operatively coupled to the camera, to run an image processing model to extract vehicle information from the image captured by the camera. The system further includes a telematics system, at the vehicle and operatively coupled to the image processing unit, to receive the vehicle information determined by the image processing unit, and transmit the vehicle information to a vehicle data collection system.

The field of interest may include an information display. The information display may include a dashboard of the vehicle, and the region of interest may cover an instrument on the dashboard that conveys vehicle information. The instrument may be a turn signal indicator, a fuel gauge, or another instrument type.

The field of interest may cover a vehicle safety feature, and the vehicle information extracted from the image may include whether the vehicle safety feature is engaged. The vehicle safety feature may be a vehicle door.

Identifying the region of interest may involve locating the region of interest and determining a type of vehicle information that the region of interest is expected to convey. The method/system may further involve selecting the image processing model, from a library of image processing models, that is appropriate to extract vehicle information from the region of interest, based on the type of vehicle information that the region of interest is expected to convey. The region of interest may cover a visual data source that conveys the vehicle information, the method/system may further involve determining a format of the visual data source, and selecting the image processing model is further based on the format of the visual data source. The method/system may further involve controlling the camera to capture images in accordance with a set of image capture instructions associated with the image processing model. The image capture instructions may be to monitor a subfield within the field of interest for a significant change, and to cause the camera to capture an image of the subfield in response to detection of a significant change.

The image may contain a plurality of regions of interest that are each expected to convey a type of vehicle information, and the method/system may further involve determining a layout of the plurality of regions of interest in the image, assigning an image processing model to each of the regions of interest, and controlling each of the image processing models to extract a respective type of vehicle information from its assigned region of interest.

The method/system may further involve collecting additional vehicle information through a conventional telematics data pathway, determining whether a trigger condition in the vehicle information collected through the conventional telematics data pathway is satisfied, and in response to satisfaction of the trigger condition, causing the camera to capture an image and causing the image processing model to extract vehicle information from the image.

The method/system may further involve determining whether a trigger condition in the vehicle information extracted by the image processing model is satisfied, and in response to satisfaction of the trigger condition, collecting additional vehicle information through a conventional telematics data pathway.

According to yet another aspect of the disclosure, an example method for training an image processing model for vehicle data collection is provided. The method involves accessing an image of a field of interest in a vehicle captured by a camera in the vehicle, providing a user interface to display the image, receive input that defines a region of interest in the image that is expected to convey vehicle information, and receive input that assigns a label to the region of interest that associates the region of interest with an image processing model that is to be trained to extract a type of vehicle information from the region of interest. The method further involves contributing the image, labelled with the region of interest and the label associating the region of interest to the image processing model, to a training data library to train the image processing model.

According to yet another aspect of the disclosure, an example system for training an image processing model for vehicle data collection is provided. The system includes a camera, positioned in a vehicle, to capture an image of a field of interest in the vehicle, one or more processors operatively coupled to the camera to access an image captured from the camera, provide a user interface to display the image, receive input that defines a region of interest in the image that is expected to convey vehicle information, and receive input that assigns a label to the region of interest that associates the region of interest with an image processing model that is to be trained to extract a type of vehicle information from the region of interest. The one or more processors are further to contribute the image, labelled with the region of interest and the label associating the region of interest to an image processing model, to a training data library to train the image processing model.

The method/system may further involve contributing the image, labelled with the region of interest and the label associating the region of interest to the image processing model, to a library of training data to train a localization model to locate similar regions of interest in other images.

The method/system may further involve contributing the image, labelled with the region of interest and the label associating the region of interest to the image processing model, to a library of training data to train a layout detector model to determine layouts of similar regions of interest in other images.

The image may include a plurality of regions of interest, wherein each of the regions of interest cover a separate visual data source that is expected to convey a different type of vehicle information. The user interface may further be to receive input that indicates a type of vehicle information expected to be conveyed by each visual data source, and the method/system may further involve contributing the image, labelled with each of the regions of interest and the labels associating each region of interest to a corresponding image processing model, to a library of training data to train a layout detector model to determine layouts of similar regions of interest in other images.

The user interface may further be to receive input that indicates a format type of each visual data source. Each of the visual data sources may include an instrument on an instrumentation panel in the vehicle. The region of interest may cover a visual data source that conveys the vehicle information in accordance with a format type, the user interface may be to receive input that indicates the format type of the visual data source, and the image processing model may be trained to extract vehicle information from an image of a visual data source of that format type.

The field of interest may include an information display. The information display may include a dashboard of the vehicle, and the image may contain a region of interest that covers an instrument on the dashboard that conveys vehicle information. The field of interest may cover a vehicle safety feature, and the vehicle information extracted from the image may include whether the vehicle safety feature is engaged.

According to yet another aspect of the disclosure, example non-transitory machine-readable storage media comprising programming instructions for vehicle data collection are provided. Example instructions cause a processor to identify a region of interest in an image, captured by a camera located in a vehicle and pointed toward a field of interest in the vehicle, that is expected to convey vehicle information, and run an image processing model over the region of interest to extract vehicle information from the image.

According to yet another aspect of the disclosure, example non-transitory machine-readable storage media comprising programming instructions for training an image processing model for vehicle data collection are provided. Example instructions cause a processor to access an image of a field of interest in a vehicle captured by a camera in the vehicle, provide a user interface to display the image, receive input that defines a region of interest in the image that is expected to convey vehicle information, and receive input that assigns a label to the region of interest that associates the region of interest with an image processing model that is to be trained to extract a type of vehicle information from the region of interest. The instructions further cause the processor to contribute the image, labelled with the region of interest and the label associating the region of interest to the image processing model, to a training data library to train the image processing model.

DETAILED DESCRIPTION

Modern vehicles are typically equipped with a host of computer systems comprising Electronic Control Units (ECUs) that control various functions of the vehicle. These ECUs can communicate with one another using a standardized communication protocol such as a Controller Area Network (CAN) protocol, an automotive ethernet protocol, or another messaging protocol, to share data among one another. In many cases, the messages transmitted over such protocols conform to a standardized higher-layer protocol that defines how the data payloads contained in the data messages are to be translated into vehicle information (e.g., OBD2, SAE J1939, CANopen). These messages may be monitored (and in some cases actively requested) by a telematics system installed in the vehicle.

However, a growing number of vehicles, particularly electric vehicles (EVs), do not rely on any standardized higher-layer protocol, making certain kinds of vehicle information difficult to obtain. Even in the case of internal combustion engine (ICE) vehicles, manufacturers are increasingly using proprietary messages for specialized purposes, without publishing instructions for how such proprietary messages are to be decoded. Thus, it is becoming increasingly difficult for telematics systems to track certain kinds of vehicle information through the conventional approach of monitoring communication activity within a vehicle.

Thus, the present disclosure describes systems and methods for collecting vehicle data by analysing images of visual data sources within a vehicle. A visual data source may include an information display, such as a dashboard (i.e., instrumentation panel), heads-up display, an indicator light, or any fixed location within the vehicle (e.g., a seatbelt, vehicle door, cargo area), that is expected to convey vehicle information, and in particular, some sort of operating status of the vehicle. Machine learning models may be trained to extract information from images of these areas, and this information may be combined with conventionally-obtained telematics data to enhance and/or supplement the information collected from the vehicle. Certain aspects of image processing may be facilitated by a dedicated image processing unit with sufficient processing capability, located onboard the vehicle, thereby alleviating processing load from the telematics system itself.

Figure 1:
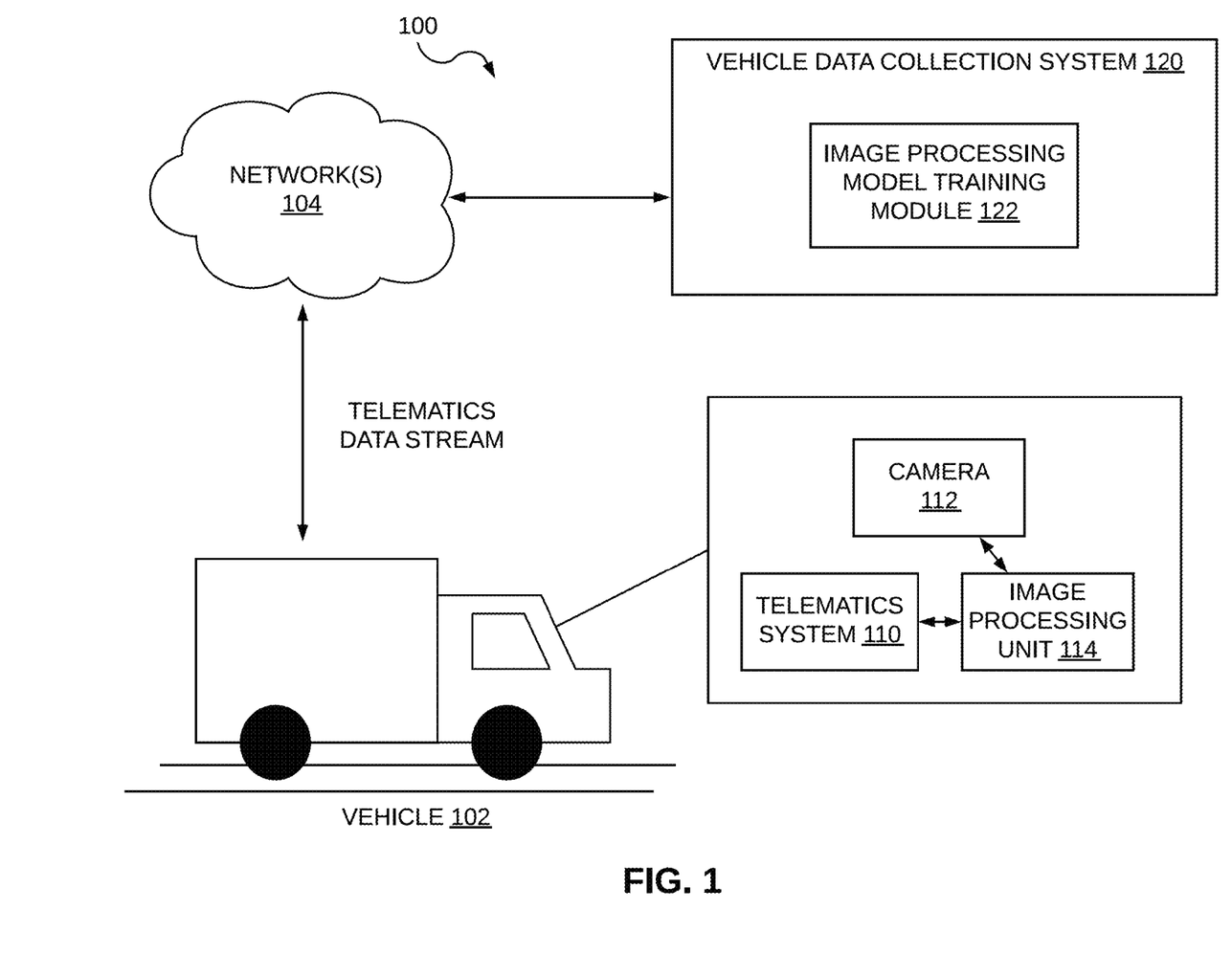
FIG. 1 is a schematic diagram of an example system for vehicle data collection.

FIG. 1 is a schematic diagram of an example system 100 for vehicle data collection. The system 100 includes a vehicle 102 that is to be tracked by a telematics system. The vehicle 102 may be any type of vehicular asset, such as a passenger vehicle, transport truck, construction equipment vehicle, sporting vehicle, utility vehicle, naval vessel, aircraft, or any other vehicular asset. For simplicity, a single vehicle 102 is shown, but it is to be understood that the system 100 may include a plurality of vehicles to be tracked.

In other examples, the system 100 may include any type of non-vehicular asset to be tracked, such as a transport trailer, shipping container, pallet, shipped item, power generator, other machine, or any other non-vehicular asset that is also tracked by a telematics system. In some cases, the asset may be associated with a vehicle (e.g., cargo onboard the vehicle, trailer connected to a vehicle). Although the present disclosure is directed primarily to the case of tracking vehicles, the teachings described herein may be applied to the tracking of non-vehicular assets in certain circumstances.

Onboard the vehicle 102, the system 100 includes a telematics system 110 that collects data from the vehicle 102. In some examples, the telematics system 110 may be an asset tracking device coupled to the vehicle 102. In other examples, the telematics system 110 may be integrated into the vehicle 102, either as an embedded device, or embodied in software and/or firmware operating on one or more computer systems onboard the vehicle 102 itself. Indeed, the telematics system 110 may comprise any combination of the above possibilities. The telematics system 110 may be generally referred to as a telematics device, asset tracking device, vehicle tracking device, telematics system, asset tracking system, vehicle tracking system, and the like.

Regardless of the configuration, the telematics system 110 comprises one or more processors/controllers that obtain data from data sources associated with the vehicle 102, which may include a sensor of the telematics system 110 (e.g., accelerometer, GPS device), or a data source of the vehicle 102 itself (e.g., an ECU communicating over a CAN bus or automotive ethernet). The data collected by the telematics system 110 may include the location of the vehicle 102 (e.g., obtained from a GPS device), motion data (e.g., obtained from an accelerometer), vehicle data such as vehicle speed, engine oil temperature, or proprietary vehicle data (e.g., obtained from an ECU of the vehicle 102), or other data. Such data may be collected at the telematics system 110 in real-time, near real-time, or in batches. Data collected directly from a data source may be referred to as raw data, which may pass through one or more filtering/simplification steps at the telematics system 110 before being transmitted to a server-side system. An example of a filtering step includes passing the raw data through a low-pass filter to remove noise that is not pertinent to the needs of the intended purpose of the data (e.g., a telematics service). Similarly, such data may pass through a data simplification process, which may include a path simplification process (i.e., curve simplification process) such as the Ramer-Douglas-Peucker algorithm or a variation thereof. The telematics system 110 then transmits/streams this data to a server-side system, such as the vehicle data collection system 120.

The vehicle data collection system 120 is remote from the vehicle 102 and is in communication with the telematics system 110 via one or more computing networks and/or telecommunication networks (indicated as network(s) 104), to receive and store the data collected by the telematics system 110. The vehicle data collection system 120 includes storage (e.g., one or more databases) to record data collected from the vehicle 102 (and other assets if applicable), including location data, trip/travel histories, sensor data, and other data. The vehicle data collection system 120 may further store user accounts and other data associated with various assets and/or telematics systems for the provision of telematics or analytics services. Thus, the vehicle data collection system 120 generally includes one or more computing devices (e.g., servers, processors) to store the data and programming instructions necessary to perform the functionality described herein, including at least one server with an appropriate network interface to communicate with the telematics system 110. The vehicle data collection system 120 may include a plurality of systems/servers in a cloud computing environment. In addition to the functionality described herein, the vehicle data collection system 120 may provide a telematics service, including live tracking, record keeping, and reporting services to end user (client) devices, and may further perform various analytics services, or forward the collected data to other systems for such purposes. In some contexts, the system 100 as a whole may be referred to as a telematics system, the vehicle data collection system 120 may be referred to as a server-side telematics system (or as being at least a part thereof), and the telematics system 110 may be referred to as a client-side telematics system.

Returning to the vehicle 102, the system 100 further includes a camera 112 and an image processing unit 114. The camera 112 may include any imaging device, such as a USB-operable camera, or any other imaging device capable of capturing an image within the vehicle 102. The camera 112 may be capable of capturing still images and/or video imagery.

The image processing unit 114 may include one or any combination of a processor, microprocessor, microcontroller (MCU), central processing unit (CPU), processing core, state machine, logic gate array, application-specific integrated circuit (ASIC), field-programmable gate array (FPGA), or similar, capable of executing, whether by software, hardware, firmware, or a combination of such, the actions performed by the image processing unit 114 as described herein, including image processing.

The camera 112 is onboard the vehicle 102, and is positioned to capture an image (or images) of a certain field of interest within the vehicle 102 that contains a visual data source. As described in greater detail elsewhere in this disclosure, the camera 112 may be configured to capture an image of an information display (e.g., dashboard or heads-up display) or another source of information that is pertinent to the operation of the vehicle 102. Such images are transmitted to the image processing unit 114, which extracts data from the image, and shares that information with the telematics system 110. These images may be captured in the form of still images or frames of a video. This data may be used by the telematics system 110 (e.g., to trigger one or more events), or for subsequent transmission to the vehicle data collection system 120.

The camera 112 may thereby be used to capture vehicle information that cannot otherwise be obtained by the telematics system 110. For example, in cases where the telematics system 110 is unable to obtain vehicle odometer from the vehicle 102 directly (e.g., through a communication port), then the camera 112 may capture an image of the odometer on the instrumentation panel of the vehicle 102, and the odometer reading may be extracted by the image processing unit 114. This data may be shared with telematics system 110 and transmitted to the vehicle data collection system 120 as if it were collected by the telematics system 110 itself, thereby supplementing the telematics system 110 with data that it was unable to collect directly.

To this end, the image processing unit 114 may be loaded with a range of image processing models that are each trained to extract a certain type of vehicle information from an image that contains a certain region of interest that covers a certain visual data source. For example, the image processing unit 114 may be loaded with an image processing model to extract an odometer reading from an image that includes an odometer, an image processing model to extract fuel level from an image that includes a fuel gauge, and so on.

Further, the image processing unit 114 may intelligently determine what kinds of visual data sources are within view of the camera 112, select one or more image processing models to extract vehicle information from those visual data sources, and run the appropriate image processing models accordingly. That is, the image processing unit 114 may analyse a raw image captured by the camera 112, identify various regions of interest in the image (e.g., odometer, fuel gauge), and determine which image processing models are to be run against which regions of interest.

In some cases, the image processing unit 114 may control the camera 112 to efficiently capture data from only those regions areas within its field of view that are determined to be regions of interest. For example, the image processing unit 114 may direct the camera 112 to transmit only a small portion of its field of view (i.e., a subfield), which corresponds to the location of a fuel gauge on an instrumentation pane, to the image processing unit 114 (i.e., a region of interest), thereby avoiding the needless capture and processing of image data that does not convey vehicle information, thereby saving on bandwidth, processing resources, and enabling the camera 112 to capture images of the more important areas within view more frequently.

The system 100 further includes an image processing model training module 122, shown for example as being hosted by the vehicle data collection system 120. The image processing model training module 122 is a place for users to submit training data that is used to train the various image processing models used by the image processing unit 114, as described in greater detail elsewhere in this disclosure. The vehicle data collection system 120 may also be used to evaluate the performance of such image processing models.

Once trained, the vehicle data collection system 120 may push the necessary image processing models to the image processing unit 114 (i.e., via the network(s) 104 and telematics system 110), to be used in the operation of tracking the vehicle 102.

Figure 2:
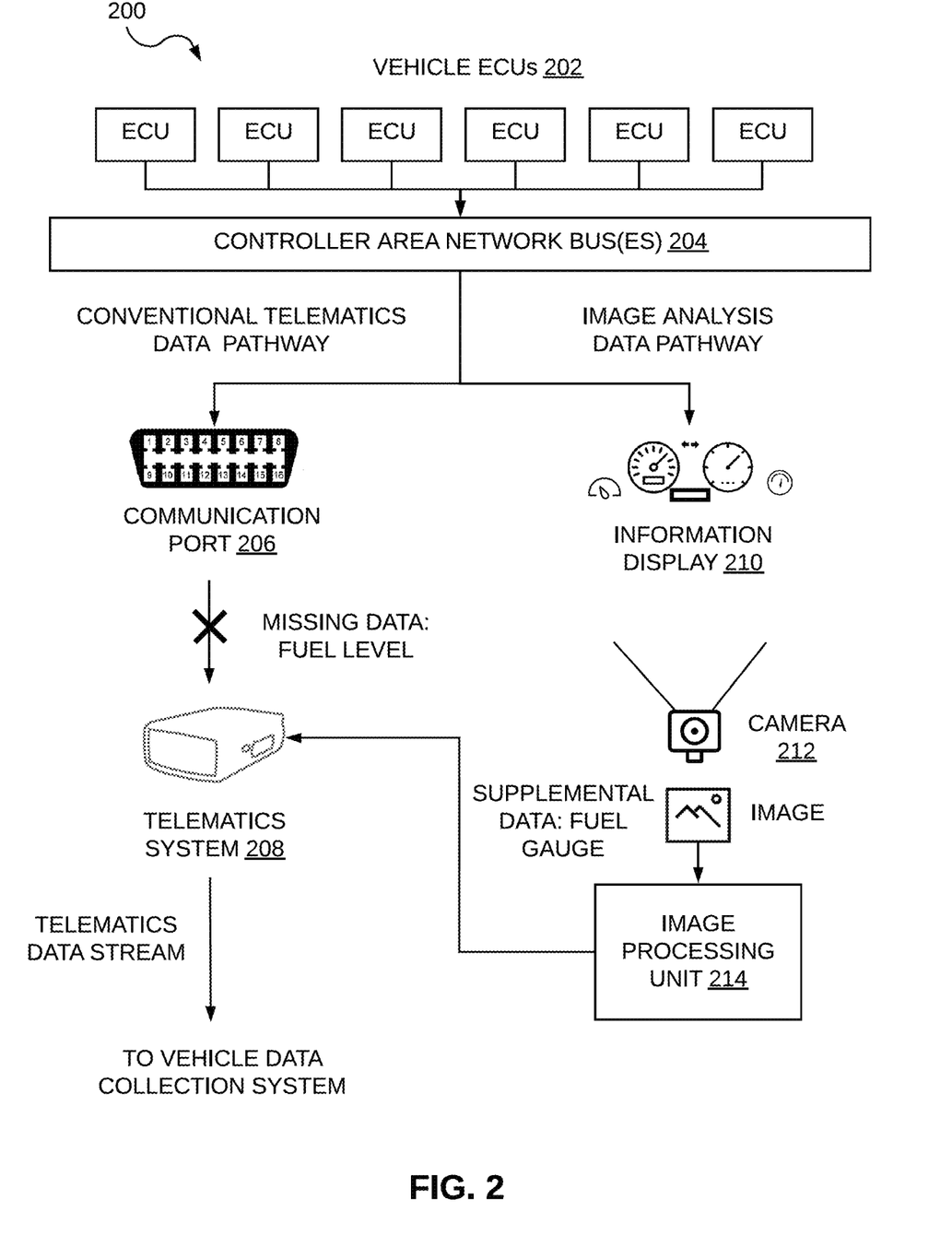
FIG. 2 is a schematic diagram of another example system for vehicle data collection, detailing parallel pathways for conventional telematics data collection and image analysis data collection.

FIG. 2 is a schematic diagram of another example system 200 for vehicle data collection, detailing parallel pathways for conventional telematics data collection and image analysis data collection. The system 200 is to illustrate one example of how data collected from a vehicle, such as the vehicle 102 of the system 100 of FIG. 1, may flow toward a vehicle data collection system. Thus, various aspects of the system 200 may be further understood with reference to the description of the system 100 FIG. 1 and related systems.

The system 200 includes several vehicle ECUs 202, which may be sources of vehicle information for a vehicle, as described in FIG. 1. The vehicle ECUs 202 communicate over one or more Controller Area Network (CAN) buses 204. Under the conventional telematics data pathway, the vehicle ECUs 202 may make certain vehicle information available to a communication port 206 (e.g., an OBD2 port) connected to the CAN bus(es) 204, which may be accessed by a telematics system 208 (e.g., a self-contained tracking device that couples to the OBD2 port), and transmitted to a vehicle data collection system.

However, certain types of vehicle information may not be readily available to the telematics system 208 through the conventional telematics pathway. For example, the telematics system 208 may not be able to decode data messages that contain a certain type of vehicle information, or a certain type of vehicle information may not be made available over the CAN bus(es) 204. For example, information about the fuel level of the vehicle may not be available. It nevertheless may be desirable to collect this vehicle information. In such circumstances, the data that is unavailable over the conventional telematics data pathway may be collected under the image analysis data pathway.

Under the image analysis data pathway, the ECUs 202 may make certain vehicle information available to an information display 210 (e.g., a dashboard, instrumentation panel or heads-up display) or another visual data source. A camera 212 may capture an image of the information display 210, and an image processing unit 214 may process the image to extract vehicle information from the image. For example, the camera 212 may capture an image of a dashboard of the vehicle that contains a fuel gauge, and the image processing unit 214 may identify the fuel gauge and determine a fuel level reading from the image. This data may be shared with the telematics system 208 and transmitted to the vehicle data collection system. Thus, vehicle information that cannot be obtained through the conventional telematics data pathway may be obtained through the image analysis data pathway.

In some examples, the data collected through the image analysis data pathway may be bundled into data packets that are indistinguishable, to the vehicle data collection system, from data packets that contain data collected through the conventional telematics data pathway. In other words, it may not be apparent to the vehicle data collection system whether the data was obtained through one pathway or the other. In other examples, data collected through the image analysis data pathway may be bundled into a data packet that includes metadata that identifies the information as being obtained through image analysis.

In some cases, where a certain type of information is available through both the conventional telematics data pathway and the image analysis data pathway, both forms of information may be transmitted to the vehicle data collection system (with the respective data sources being indicated), for the purposes of comparison. In some cases, the data extracted through the image analysis data pathway may be transmitted along with the source image from which the data was extracted, which, when combined with the same data collected through the conventional telematics data pathway at the same time, may be used to check the accuracy of the image processing model used to extract that data, and to train the image processing model accordingly. In some cases, the collection of the same data from both data sources may be used merely to identify a discrepancy, which may suggest an issue with the manner in which data is communicated through one pathway or the other.

Thus, vehicle information may be collected through an image analysis data pathway, and additional vehicle information may be collected through a conventional telematics data pathway. Although specific examples are provided herein, it is to be appreciated that variations to the system 200 are contemplated. For example, although the example system 200 shown in FIG. 2 describes a case in which vehicle information is transmitted over one or more CAN bus(es) 204, accessible by an asset tracking device coupleable to the vehicle (telematics system 208), it is to be understood that the two parallel data collection pathways may be similarly described in cases where a different communication protocol is in use (e.g., automotive ethernet), or when the telematics system 208 is integrated into the vehicle itself (e.g., embodied in software). Further, the two parallel data collection pathways may be similarly described in connection with obtaining vehicle information from any sort of visual data source (e.g., speedometer, odometer, warning light, turn signal indicator), visible in any field of interest within the vehicle (e.g., vehicle dashboard, other field of interest).

Figure 3:
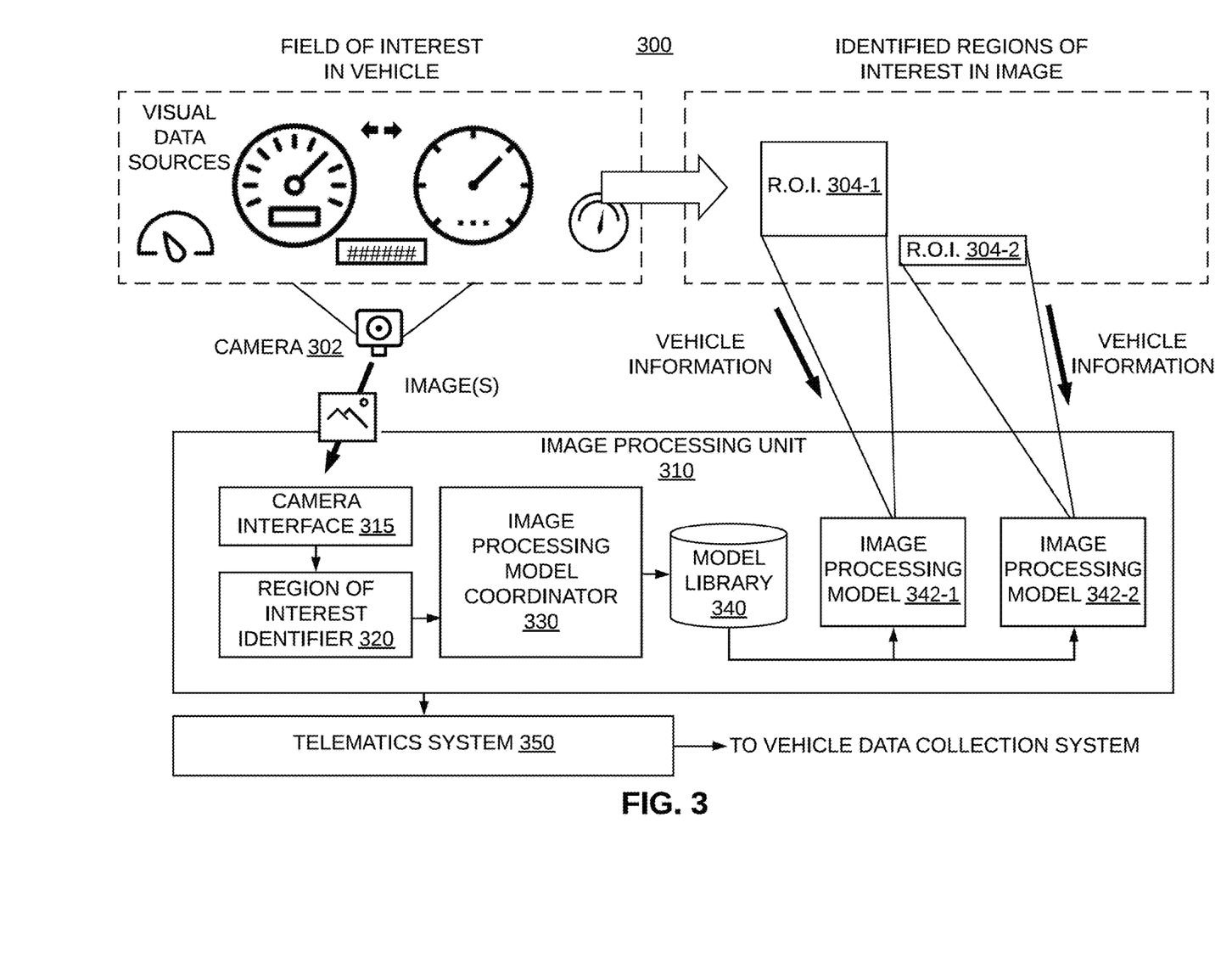
FIG. 3 is a schematic diagram of another example system for vehicle data collection, detailing the components of an image processing unit that determines vehicle information from an image captured by a camera in a vehicle.

FIG. 3 is a schematic diagram of another example system 300 for vehicle data collection, detailing the components of an image processing unit 310 that determines vehicle information from an image captured by a camera in a vehicle. The image processing unit 310 may be understood to be one example of the image processing unit 114 of FIG. 1. Thus, various aspects of the system 300 may be further understood with reference to the description of system 100 of FIG. 1 and related systems.

The system 300 includes a camera 302 (similar to the camera 112 of FIG. 1), positioned in a vehicle, to capture images of a field of interest in the vehicle that contains a visual data source. In the example shown, the field of interest in the vehicle is presented as a vehicle dashboard that contains various instruments (visual data sources) that convey vehicle information, including a speedometer, tachometer, odometer, turn signal indicators, fuel gauge, and engine oil temperature gauge. The camera 302 may be fixed (e.g., mounted) in a location in the vehicle that is in view of the field of interest. For example, the camera 302 may be strapped or mounted to the steering column, behind the steering wheel, facing toward the instrumentation panel.

The system 300 further includes an image processing unit 310 (similar to the image processing unit 114 of FIG. 1). The image processing unit 310 is operatively coupled to the camera 302, for example, by any suitable wired or wireless connection. The image processing unit 310, as described in greater detail below, receives images captured by the camera 302 and analyses the images to determine vehicle information. That is, the image processing unit 310 may run one or more image processing models to extract vehicle information from one or more images captured by the camera 302.

The system 300 further includes a telematics system 350 (similar to the telematics system 110 of FIG. 1). The telematics system 350 is operatively coupled to the image processing unit 310, for example, by any suitable wired or wireless connection. The telematics system 350 receives the vehicle information determined by the image processing unit 310 and transmits the vehicle information to a vehicle data collection system (similar to the vehicle data collection system 120 of FIG. 1).

The image processing unit 310 includes a camera interface 315, operatively coupled to the camera 302, to coordinate the capture of images by the camera 302. In some cases, the camera interface 315 passively receives images captured by the camera 302. In other cases, the camera interface 315 actively controls the capture of images by the camera 302. For example, the camera interface 315 may cause the camera 302 to capture an image in response to an instruction received by the image processing unit 310 from the telematics system 350 (e.g., based on a triggering event detected by the telematics system 350). As another example, the camera interface 315 may cause the camera 302 to capture an image on a regular schedule on a continual/ongoing basis (e.g., every 1 second, 30 seconds, or 60 seconds, depending on bandwidth capabilities). In still other examples, the camera interface 315 may cause the camera 302 to capture an image only when a significant change in the field of view of the camera 302 is detected (e.g., when an odometer increments, when a turn signal indicator light blinks, or when the camera field of view or angle changes). Still further, the camera interface 315 may cause the camera 302 to actively monitor smaller portions of its field of view (certain regions of pixels), which are known to cover visual data sources of interest, and to capture images of those regions, either periodically or upon the satisfaction of certain trigger conditions.

The image processing unit 310 further includes a region of interest identifier 320, operatively coupled to the camera interface 315, to identify/locate one or more regions of interest in an image captured by the camera 302 that is expected to convey vehicle information. That is, in the present example, the region of interest identifier 320 may identify areas of an image which correspond to a speedometer, odometer, fuel gauge, turn signal, or other areas. The region of interest identifier 320 may identify such regions of interest by applying a plurality of localization models that are each trained to identify a region of interest that corresponds to a particular visual data source. The application of one or more localization models may be referred to as the application of a layout detector model. For example, the region of interest identifier 320 may apply one localization model to identify odometer, one localization model to identify tachometer, and so forth. The region of interest identifier 320 determines not only an area where a region of interest is located (e.g., a bounding box or pixel coordinates), but also determines a label/identifier of the type of vehicle information that a region of interest is expected to convey (e.g., odometer, fuel gauge). Such a label or identifier associates a region of interest with an image processing model that is to be trained to extract a type of vehicle information from the region of interest. Each region of interest may be identified by pixel coordinates of a bounding box that contains the region of interest, the size and dimensions of such bounding boxes, or any other appropriate means to define a region of interest in an image.

In the example shown in FIG. 3, two regions of interest (R.O.I.) are identified: one region of interest, labelled as R.O.I. 304-1, that corresponds to a speedometer, and a second region of interest 304-2, labelled as R.O.I. 304-2, that corresponds to an odometer.

The image processing unit 310 further includes an image processing model coordinator 330, operatively coupled to the camera interface 315 and region of interest identifier 320, which selects one or more image processing models, based on the identified regions of interest, to extract vehicle information from those regions of interest. The image processing model coordinator 330 may attempt to match each identified region of interest to the appropriate image processing model by matching labels of identified regions of interest to labels of image processing models. For example, where a region of interest was identified as pertaining to fuel gauge, the image processing model coordinator 330 will select an image processing model that is trained to extract fuel level from an image of a fuel gauge. Further, where a region of interest was identified as pertaining to a specific format of fuel gauge, the image processing model coordinator 330 may select an image processing model that is trained to extract fuel level from an image of a fuel gauge of that format.

The image processing model coordinator 330 may further configure the camera 302, via the camera interface 315, to capture one or more images in accordance with a set of image capture instructions associated with each region of interest identified to be in its field of view. Each image processing model may be associated with a "preferred" set of instructions for how the camera 302 is to capture images in a manner that is best suited for processing by the image processing model. For example, an image processing model may be associated with a set of instructions that requests that an image be captured in response to a change in the visual field of the camera (e.g., an image processing model for turn signal may be associated with a set of instructions for the camera 302 to monitor a small area within its field of view (i.e., subfield) corresponding to the turn signal indicator and capture an image each time there is a significant change therein (i.e., when the turn signal indicator blinks)). As another example, an image processing model may be associated with a set of instructions that requests that an image be captured periodically (e.g., an image processing model for speedometer may be associated with a set of instructions that the camera 302 is to capture an image every second, every thirty seconds, or every sixty seconds). As yet another example, an image processing model may be associated with a set of instructions that requests that an image be captured in response to a trigger condition being satisfied in another kind of data (e.g., an image processing model for seat belt indicator may be associated with a set of instructions for the camera 302 to capture an image when the vehicle shifts from park to drive as determined by the telematics system 350). Thus, the image processing model coordinator 330 may instruct the camera 302 to capture images in accordance with the needs of the image processing models that are selected to capture information from the visual data sources that are within the field of view of the camera 302.

The image processing unit 310 stores a model library 340 in which a range of image processing models are stored, each image processing model being trained to extract a certain type of vehicle information from an image that contains a certain region of interest. Each image processing model may employ one or more filtering, alignment, feature extraction, or other image processing techniques, that are specifically applicable to extract the kind of vehicle information it is designed to extract. For example, an image processing model that is configured to extract an odometer reading from an image of an odometer may apply one or more filters, image alignment/registration, and optical character recognition, to extract an odometer reading from the image. As another example, an image processing model that is configured to extract fuel level from an image of a fuel gauge may apply one or more filters, and a probabilistic model that estimates where the needle of the fuel gauge is situated between "full" and "empty", to extract a fuel level reading from the image. Other image processing models may employ other image analysis techniques, such as neural networks, or other deep learning techniques, to extract data from a variety of visual data sources. Any of these image processing models may be selected by the image processing model coordinator 330 when needed, as described above.

An image filtering process may include the application of any image filter that improves the extraction of vehicle information from an image, such as motion blur reduction, glare reduction, a binary filter, image erosion, image sharpening, Otsu thresholding, or another image filtering technique. An image alignment process may include an image registration process in which one or more key points are extracted from a reference image (a previously captured image of the field of interest) and a source image (the image from which vehicle information is to be extracted), and the source image is aligned to the reference image by application of a transformation matrix. In other words, an amount of rotation/translation or other shift/movement of the camera 302 between the source image and the reference image is corrected.

Returning to the specific example shown in FIG. 3, the image processing model coordinator 330 selects image processing model 342-1, which is trained to extract speedometer information from images of speedometers, and assigns this model to region of interest 304-1, and further selects image processing model 342-2, which is trained to extract odometer information from images of odometers, and assigns this model to region of interest 304-2. The image processing model coordinator 330 may then control each of the image processing models 342-1, 342-2 to extract a respective type of vehicle information from its assigned region of interest. The image processing model coordinator 330 may control each image processing model by feeding each respective image processing model image data (e.g., by feeding each image processing model image data that corresponds to its associated region of interest, or by feeding each model an entire image), receiving the results, and when necessary, controlling the camera interface 315 to capture images in accordance with the appropriate image capture instructions.

The model library 340 may further include one or more layout detector models which are configured to determine a layout of a plurality of regions of interest in an image of a field of interest in the vehicle. As described above, the region of interest identifier 320 may apply a layout detection model, which may involve the application of one or more localization models to an image to identify regions of interest in the image, to identify/locate regions of interest in an image. These models may be stored in the model library 340 or another location accessible to the region of interest identifier 320.

Although specific examples are provided herein, it is to be appreciated that variations to the system 300 are contemplated. For example, in some cases, the functionality of the image processing unit 310 and the telematics system 350 may be performed by a single unit with sufficient memory and processing capabilities. As another example, the system 300 may be applied to extract vehicle information from other fields of interest, such as a heads-up display, another information display, or another area within the vehicle that is expected to convey vehicle information, and other regions of interest may be identified, such as regions of interest that cover other instrumentation types. Further, the model library 340 may contain different image processing models to extract vehicle information from different formats of the same instrumentation type (e.g., different formats of a fuel gauge). The region of interest identifier 320 may identify those different format types, and the image processing model coordinator 330 may select appropriate image processing models for those formats.

Figure 4:
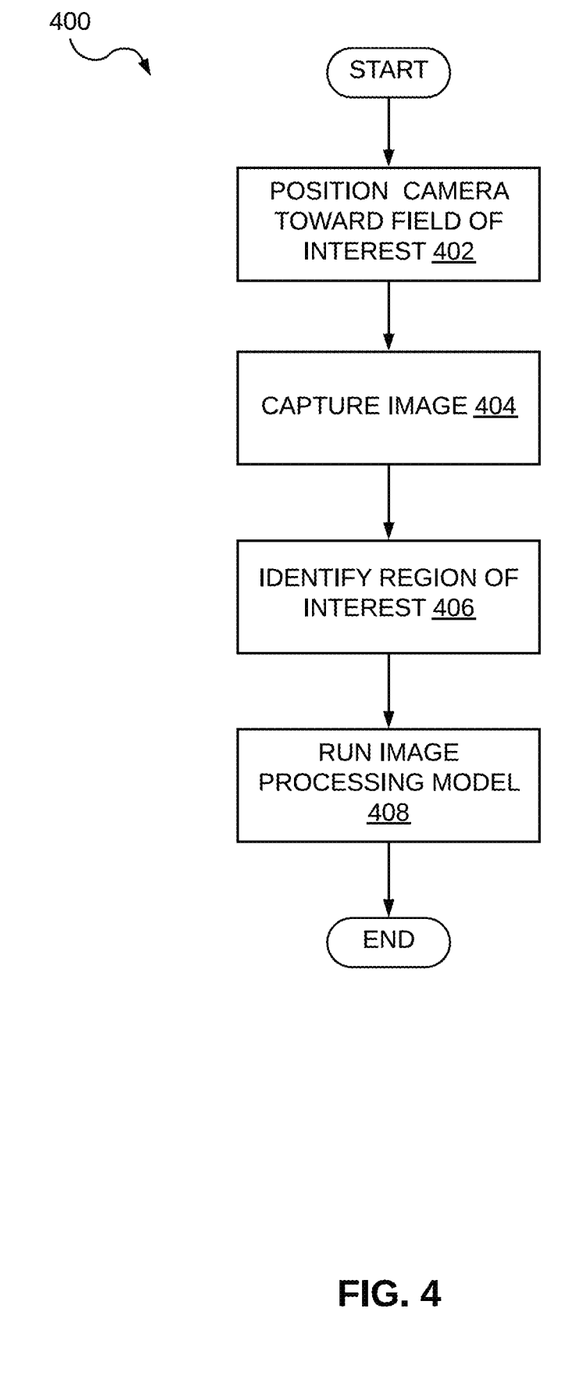
FIG. 4 is a flowchart of an example method for vehicle data collection.

FIG. 4 is a flowchart of an example method 400 for vehicle data collection. The method 400 briefly describes one example of how the system 300 may collect vehicle information from an image, and thus for convenience, the method 400 will be described with respect to the elements described in the system 300 of FIG. 3. For greater appreciation of the details and possible variations of the method 400, the description of the system 300 of FIG. 3 and related systems may be referenced. Further, it should be noted that certain operations in the method 400 may be embodied in programming instructions storable on a non-transitory machine-readable storage medium and executable by the image processing unit 310 of FIG. 3 and/or related systems. However, it is to be understood that the method 400 may be performed by other systems.

At operation 402, the camera 302 is positioned in a vehicle to be pointed toward a field of interest in the vehicle. At operation 404, the camera 302 captures an image of the field of interest. At operation 406, the image processing unit 310 identifies a region of interest in the image that is expected to convey vehicle information (e.g., via the region of interest identifier 320). Prior to identification of a region of interest, one or more filtering and alignment processes may be applied to the image to allow vehicle information to be extracted from the image more reliably. At operation 408, the image processing unit 310 runs an image processing model (e.g., image processing model 342-1, 342-2, or another model in the model library 340) over the region of interest to extract vehicle information from the image (e.g., via image processing model coordinator 330). The extracted vehicle information may be transmitted to the telematics system 350, and thereby transmitted to a vehicle data collection system.

Figure 5:
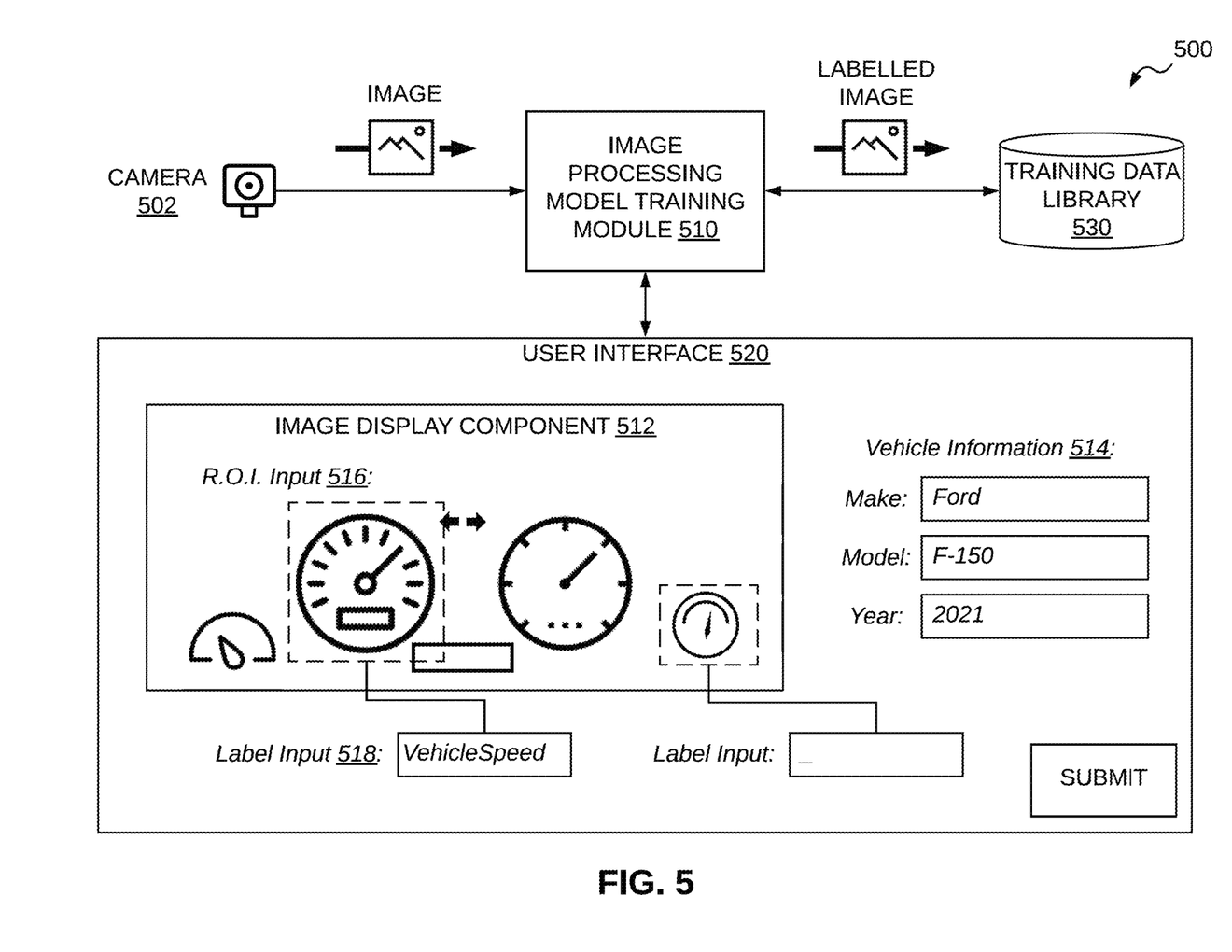
FIG. 5 is a schematic diagram of an example system for training an image processing model for an image processing unit.

FIG. 5 is a schematic diagram of an example system 500 for training image processing models for an image processing unit, such as the image processing model training module 122 of the system 100 of FIG. 1. For greater appreciation of the details and possible variations of the system 500, the description of the system 100 of FIG. 1 and related systems may be referenced, but it is to be understood that the system 500 is to be applicable to the training of other image processing units.

The system 500 includes a camera 502 (similar to the camera 112 of FIG. 1), positioned in a vehicle, to capture an image of a field of interest in the vehicle. Images captured by the camera 502 may be accessed by the image processing model training module 510 by any suitable means.

The system 500 further includes a user interface 520, provided by the image processing model training module 510 or related system, to allow users to assign labels to images captured by the camera 502 to be used in the training of image processing models. Once labelled at the user interface 520, the images may be added to a training data library 530, to be used to train image processing models.

The user interface 520 includes an image display component 512 that displays an image captured by the camera 502. The image display component 512 may display a plurality of images, or may allow a user to select one among a plurality of images for viewing, but a single image is shown for simplicity.

The user interface 520 is configured to receive input that defines a region of interest in an image that is expected to convey vehicle information. Such input may be received by, for example, a user drawing a box over the relevant portion of the image display component 512 that corresponds to a particular instrument on a vehicle dashboard that is expected to convey vehicle information, by input of one or more coordinates of the region of interest, or by another input means.

The user interface 520 is also configured to receive input that labels a defined region of interest with an information type that corresponds to an image processing model that is to be trained to extract vehicle information from the defined region of interest. Such input may be received by, for example, through a text box, drop down menu, radio selection, or other input means associated with a defined region of interest, in which a user inputs an identifier of a particular type of vehicle information that is expected to be conveyed by the defined region of interest. The user interface 520 may also include a vehicle information component 514 that is configured to receive user input that defines basic identifying information about the type of vehicle in which the image was captured, which may further be used to label the image, and used as part of the training data to train image processing models.

Thus, in the example shown, the image display component 512 may display an image of a vehicle dashboard that includes instrumentation for a speedometer, tachometer, odometer, fuel gauge, and engine oil temperature gauge. A user of the user interface 520 may define a first region of interest by drawing a bounding box, indicated as R.O.I. input 516, around the speedometer, and a second region of interest around the fuel gauge. A user may then label the defined region of interest with the indicator "VehicleSpeed" in a text box, indicated as label input 518, to indicate that it is expected that the defined region of interest will convey information regarding the speed of the vehicle. The user may similarly label the region of interest defined around the fuel gauge with a corresponding indicator. A user may also input information about the vehicle in which the image was captured, such as the vehicle make, model, and year, into the vehicle information component 514. Once labelling is complete, a user may submit the labelled image (e.g., by pressing a "submit" button) to the image processing model training module 510, to be used for training of the appropriate image processing models.

An image that is labelled with one region of interest that contains one visual data source may be used to train an image processing model that is dedicated to extract vehicle information from that data source (e.g., a particular instrument type on a particular vehicle type). An image that is labelled with more than one region of interest, each of which covers a separate visual data source that is expected to convey a different type of vehicle information (or in a different format), may be used to train multiple image processing models (e.g., an image processing model that corresponds to each type of vehicle information identified in the image).

In some cases, the image processing model training module 510 may compile a plurality of images captured within vehicles of the same vehicle type, that are labelled with the same type of region of interest, to train an image processing model to extract information from that type of region of interest in that vehicle. In other cases, the image processing model training module 510 may compile a plurality of images captured within vehicles of different vehicle types, still labelled with the same type of regions of interest, to train image processing models in a way that is agnostic as to the vehicle type from which the images were collected. For example, the image processing model training module 510 may use a plurality of images of speedometers captured from a plurality of different vehicle types (in which information may be presented in different formats) in order to train an image processing model that is capable of identifying and reading odometer in different vehicle types.

Further, the image processing model training module 510 may put the images captured herein toward training an image localization model, or layout detector model, to determine a layout of plurality of regions of interest in an image captured in a vehicle of an unknown vehicle type. Thus, the image processing model training module 510 may contribute an image, with a labelled region of interest, to a library of training data to train a localization model to locate similar regions of interest in other images. Similarly, the image processing model training module 510 may contribute the image, with the labelled region of interest, to a library of training data to train a layout detector model to determine layouts of similar regions of interest in other images. A layout detector model trained in such a manner may thereby be configured to determine, from an image captured from within an unknown vehicle type, a layout of various visual data sources within a field of interest (e.g., a layout of instruments on an instrumentation panel). Such a layout may be used to determine which image processing models should be applied to which regions of an image.

The image processing model training module 510 may further train an image processing model using user feedback regarding predictions made by image processing models. For example, the image processing model training module 510, or a related system, may provide the user interface 620, shown in FIG. 6, for receiving user feedback regarding predictions made by image processing models. Such feedback may be used evaluate, and to further train the image processing models trained by the image processing model training module 510. Such feedback may be aggregated and analysed to evaluate the effectiveness of the image processing models.

Figure 6:
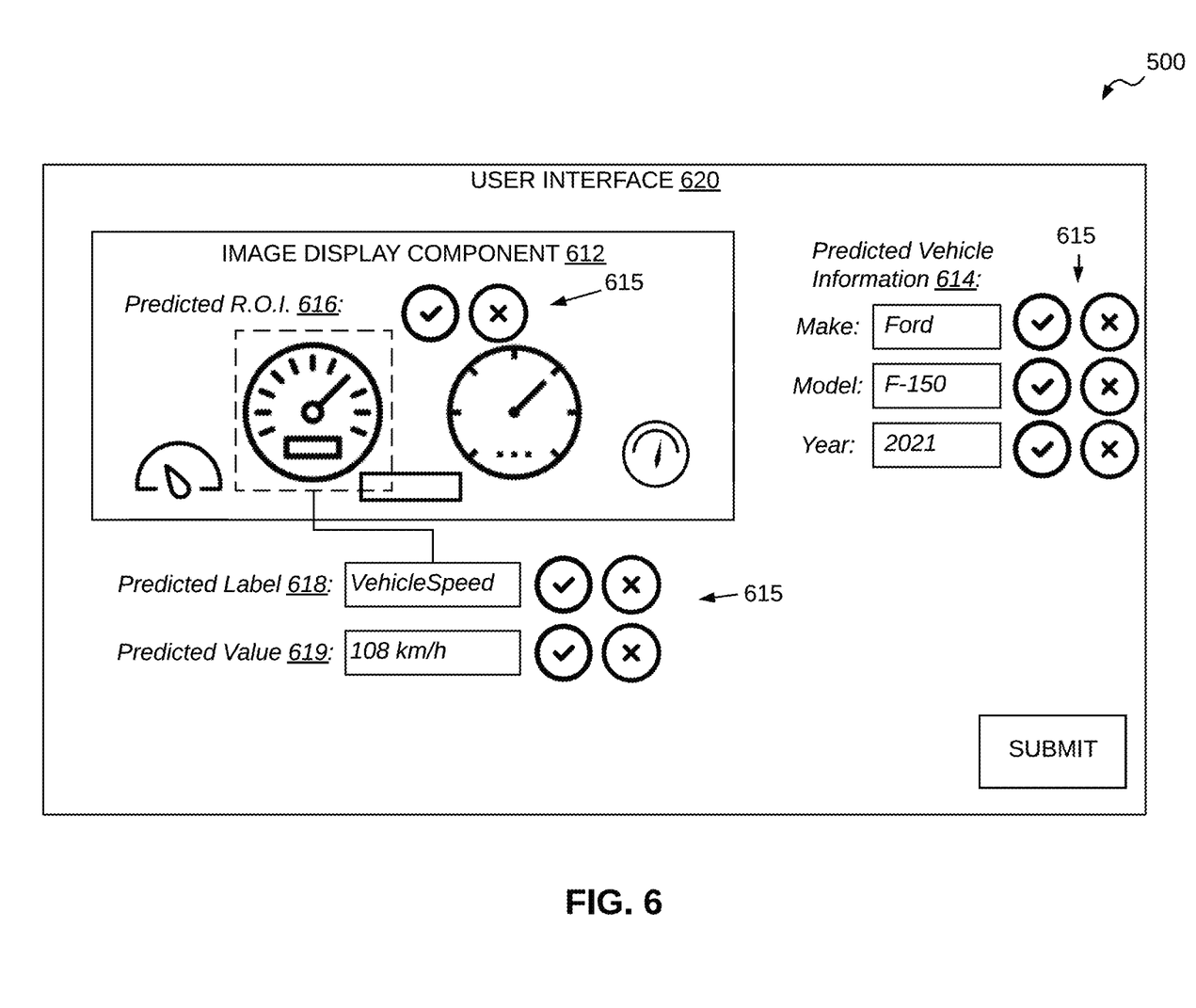
FIG. 6 is a schematic diagram of an example user interface for receiving user feedback for training an image processing model.

The user interface 620 includes an image display component 612 that displays an image that is expected to contain one or more regions of interest from which vehicle information may be extracted. Similar to the user interface 520, the image display component 612 may display a plurality of images, or may allow a user to select one among a plurality of images for viewing, but a single image is shown for simplicity.

The image display component 612 is configured to display a predicted region of interest 616, generated by a layout detector model or localization model, around an area of the image that is predicted to correspond to a region of interest for a particular visual data source. Thus, in the example shown, the predicted region of interest 616 is shown around a speedometer of a vehicle dashboard. The user interface 620 is configured to receive input that indicates whether the predicted region of interest 616 is accurate. For example, the user interface 620 may provide buttons 615 that allow a user to indicate whether the predicted region of interest 616 accurately covers the speedometer, and/or may provide additional functionality to edit the predicted region of interest 616, by any input means.

The user interface 620 further displays a predicted label 618 and a predicted value 619 corresponding to the information type, and the extracted vehicle information, determined by an image processing model. Thus, in the example shown, the predicted label 618 indicates that the speedometer is to convey vehicle speed, and that the vehicle speed extracted is 108 km/h. As with the predicted region of interest 616, the user interface 620 is configured to receive input that indicates whether the predicted label 618 and/or predicted value 619 are accurate, and/or provide additional functionality to edit such information by any input means (e.g., buttons 615).

The user interface 620 may also display predicted vehicle information 614, determined by a layout detector model, that predicts the vehicle type of the vehicle in which the image was taken. Thus, in the example shown, the predicted vehicle information 614 indicates that the image was taken in a 2021 Ford F-150. As with the above, the user interface 620 is configured to receive input that indicates whether the predicted vehicle information 614 is accurate, and/or provide additional functionality to edit such information by any input means (e.g., buttons 615).

Thus, a user may review the image displayed in the image display component 612, provide feedback as to the accuracy of the information extracted from the image, and this feedback may be used to train image processing models and/or layout detector models.

Figure 7:
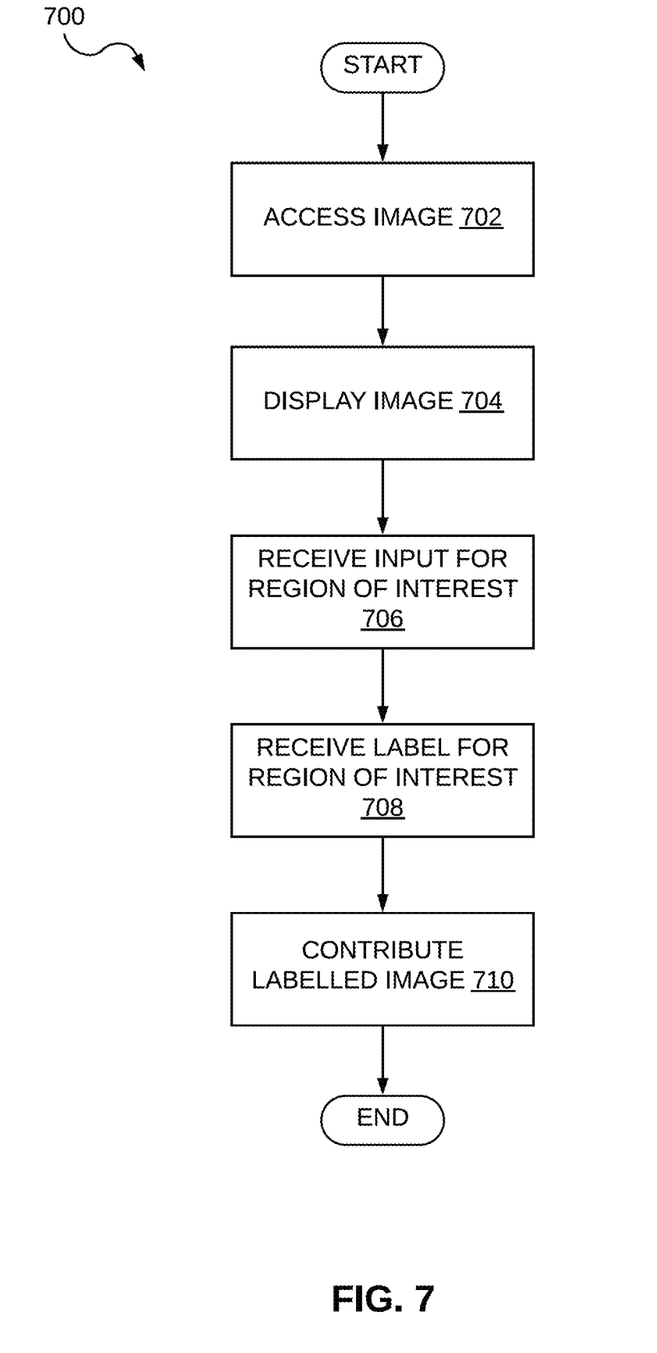
FIG. 7 is a flowchart of an example method for training an image processing model for an image processing unit.

FIG. 7 is a flowchart of an example method 700 for training an image processing model for an image processing unit. The method 700 briefly describes one example of how the system 500 and related systems may be used to train an image processing model, and thus for convenience, the method 700 will be described with respect to the elements described in the system 500 of FIG. 5. For greater appreciation of the details and possible variations of the method 700, the description of the system 500 of FIG. 5 and related systems may be referenced. Further, it should be noted that certain operations in the method 700 may be embodied in programming instructions storable on a non-transitory machine-readable storage medium and executable by the image processing model training module 510 of FIG. 5. However, it is to be understood that the method 700 may be performed by other systems.

At operation 702, the image processing model training module 510 accesses an image of a field of interest in a vehicle captured by the camera 502, which is located in the vehicle. At operation 704, the image processing model training module 510 provides the user interface 520 to display the image. At operation 706, the user interface 520 receives input that labels the defined region of interest 516, which is a region in the image that is expected to convey vehicle information. At operation 708, the user interface 520 receives input that labels the defined region of interest 516 with a label that associates the defined region of interest with a corresponding image processing model that is to be trained to extract a corresponding type of vehicle information from the defined region of interest. At operation 710, the image processing model training module 510 contributes the image, labelled with the defined region of interest 516 and label that associates it with a corresponding image processing model, to a training data library 530 to train the image processing model. Such training data may further be used to train image localization models or layout detector models.

Thus, vehicle information that may not be otherwise readily obtained through a conventional telematics system may be obtained via image analysis of images taken of visual data sources within a vehicle.

Although specific examples are provided herein, it is to be appreciated that variations to the methods and systems described herein are contemplated. For example, although the illustrations of visual data sources from which vehicle information may be extracted provided herein have been centred around common instruments present on most vehicle dashboards, vehicle information may be extracted from other visual data sources.

For example, in cases where a camera is installed in an electric vehicle, certain types of vehicle information that are particular to electric vehicles may be extracted from visual data sources on the vehicle dashboard which may or may not be accessible by other means, including a state-of-charge indicator that indicates whether the vehicle is in a charging state, a range indicator that indicates the remaining range that the vehicle can travel on battery power, a battery health indicator, or other visual data sources.

As another example, another visual data source may be present in another field of interest in the vehicle other than the dashboard, such as, for example, a heads-up display, a media display screen, or another type of display screen. A field of interest may include a storage area within the vehicle for storing cargo. In such examples, a camera may capture images of the storage area, and an image processing unit may count a number of boxes or otherwise quantify an amount of cargo stored in the storage area, and relay that information to a telematics system. Another field of interest may include an area of the vehicle associated with a vehicle safety feature, such as a seatbelt, or a vehicle door, and a camera may monitor such areas to determine whether such safety features are engaged (e.g., whether a door is opened or closed, or whether a seatbelt is engaged or disengaged).

In some cases, the collection of vehicle information through the conventional telematics data pathway and the image analysis data pathway may be understood to be separate parallel processes that operate independent of one another. In other cases, the collection of vehicle data through these different streams may impact one another and indeed enhance one another in various ways.

For example, the satisfaction of a certain trigger condition detected in the conventional telematics pathway may trigger the camera to capture a certain type of information in a certain way through the image analysis data pathway, in accordance with the mode of image capture necessary for the appropriate image processing models. For example, a determination by a telematics system that a vehicle speed threshold has been exceeded may trigger a camera to capture an image of a seatbelt indicator on the vehicle dashboard, an image of the driver side door to determine whether the door is open or closed, or another field of interest that contains a visual data source that may be of interest in the event that a vehicle speed threshold is exceeded. As another example, a determination by a telematics system that a vehicle is making a turn, whether by GPS data or accelerometer or another means, may trigger a camera to capture an image of a turn signal indicator to determine whether a turn signal was engaged during a turn.

Or vice versa, as another example, the satisfaction of a certain trigger condition detected through the image analysis data pathway may trigger the telematics device to capture a certain type of information in a certain way through the conventional telematics pathway. For example, a determination through the image analysis data pathway that a seatbelt indicator indicates that a seatbelt has been disengaged may trigger the telematics device to capture/record a GPS point that specifically indicates the location at which the seatbelt was engaged. As another example, the detection of the presence of a "check engine" warning light through the image analysis data pathway may cause the collection of vehicle diagnostic data through the telematics device at a higher rate than usual so as to provide more detailed vehicle information for vehicle diagnostic purposes.

Moreover, as yet another example, the satisfaction of a certain trigger condition detected through the image analysis data pathway may trigger the camera to capture a certain type of information in a certain way through the image analysis data pathway. For example, a determination through the image analysis data pathway that a lane departure indicator indicates that the vehicle is departing from a lane may trigger the camera to monitor and capture imagery of a region of the vehicle dashboard corresponding to a turn signal indicator to determine whether the vehicle had a turn signal engaged during the lane departure.

Thus, it should be seen that the teachings herein provide a number of methods and systems to collect vehicle information through the analysis of images captured from within a vehicle. It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A method comprising:
   identifying a plurality of regions of interest in an image, captured by a camera located in a vehicle and pointed toward a field of interest in the vehicle, that are each expected to convey a type of vehicle information relating to an operating status of the vehicle, the plurality of regions of interest comprising a first region of interest that is expected to convey a first type of vehicle information relating to a first type of operating status of the vehicle and a second region of interest that is expected to convey a second type of vehicle information relating to a second type of operating status of the vehicle, the second type of vehicle information being different from the first type of vehicle information;
   running a first image processing model over the first region of interest to extract the first type of vehicle information from the image, wherein:
     the first image processing model is associated with a first set of image capture instructions indicating how the camera is to capture one or more images of the first region of interest for processing by the first image processing model, and
     running the first image processing model comprises extracting, from the image, the first type of vehicle information relating to the first type of operating status of the vehicle;
   running a second image processing model over the second region of interest to extract the second type of vehicle information from the image, wherein:
     the second image processing model is associated with a second set of image capture instructions indicating how the camera is to capture one or more images of the second region of interest for processing by the second image processing model, the second set of image capture instructions being different from the first set of image capture instructions, and
     running the second image processing model comprises extracting, from the image, the second type of vehicle information relating to the second type of operating status of the vehicle; and transmitting the first type of vehicle information and the second type of vehicle information to a vehicle data collection system.

2. The method of claim 1, wherein the field of interest comprises an information display.

3. The method of claim 2, wherein the information display comprises a dashboard of the vehicle, and the plurality of regions of interest cover a plurality of instruments on the dashboard that each convey a different type of vehicle information.

4. The method of claim 3, wherein an instrument of the plurality of instruments comprises a turn signal indicator.

5. The method of claim 3, wherein an instrument of the plurality of instruments comprises a fuel gauge.

6. The method of claim 1, wherein the field of interest comprises a vehicle safety feature, and wherein the first or second type of vehicle information extracted from the image comprises whether the vehicle safety feature is engaged.

7. The method of claim 6, wherein the vehicle safety feature comprises a vehicle door.

8. The method of claim 1, wherein identifying the plurality of regions of interest comprises locating each of the plurality of regions of interest and determining the type of vehicle information that the region of interest is expected to convey.

9. The method of claim 8, further comprising:
selecting the first image processing model, from a library of image processing models, that is appropriate to extract the first type of vehicle information from the first region of interest, based on the first type of vehicle information that the first region of interest is expected to convey; and
selecting the second image processing model, from the library of image processing models, that is appropriate to extract the second type of vehicle information from the second region of interest, based on the second type of vehicle information that the second region of interest is expected to convey.

10. The method of claim 9, wherein the first region of interest covers a visual data source that conveys the first type of vehicle information, the method further comprising:
determining a format of the visual data source, and
selecting the first image processing model is further based on the format of the visual data source.

11. The method of claim 9, further comprising controlling the camera to capture the one or more images of the first or second region of interest in accordance with the first or second set of image capture instructions associated with the first or second image processing model.

12. The method of claim 11, wherein the first set of image capture instructions are to monitor a subfield within the field of interest for a significant change, and to cause the camera to capture an image of the subfield in response to detection of a significant change.

13. The method of claim 1, wherein the method further comprises:
determining a layout of the plurality of regions of interest in the image;
assigning an image model to each of the regions of interest; and
controlling each of the image processing models to extract a respective type of vehicle information from its assigned region of interest.

14. The method of claim 1, further comprising:
collecting additional vehicle information through a conventional telematics data pathway;
determining whether a trigger condition in the additional vehicle information collected through the conventional telematics data pathway is satisfied; and
in response to satisfaction of the trigger condition, causing the camera to capture an image of the field of interest and causing an image processing model to extract vehicle information from the image.

15. The method of claim 1, further comprising:
determining whether a trigger condition in the first or second type of vehicle information extracted by the first or second image processing model is satisfied; and
in response to satisfaction of the trigger condition, collecting additional vehicle information through a conventional telematics data pathway.

16. A system comprising:
a camera, positioned in a vehicle, configured to capture an image of a field of interest in the vehicle;
an image processing unit, at the vehicle and operatively coupled to the camera, configured to:
identify a plurality of regions of interest in the image that are each expected to convey a type of vehicle information relating to an operating status of the vehicle, the plurality of regions of interest comprising a first region of interest that is expected to convey a first type of vehicle information relating to a first type of operating status of the vehicle and a second region of interest that is expected to convey a second type of vehicle information relating to a second type of operating status of the vehicle, the second type of vehicle information being different from the first type of vehicle information;
run a first image processing model over the first region of interest to extract the first type of vehicle information from the image captured by the camera, wherein:
the first image processing model is associated with a first set of image capture instructions indicating how the camera is to capture one or more images of the first region of interest for processing by the first image processing model, and
running the first image processing model comprises extracting, from the image, the first type of vehicle information relating to the first type of operating status of the vehicle; and
run a second image processing model over the second region of interest to extract the second type of vehicle information from the image, wherein:
the second image processing model is associated with a second set of image capture instructions indicating how the camera is to capture one or more images of the second region of interest for processing by the second image processing model, the second set of image capture instructions being different from the first set of image capture instructions, and
running the second image processing model comprises extracting, from the image, the second type of vehicle information relating to the second type of operating status of the vehicle; and
a telematics system, at the vehicle and operatively coupled to the image processing unit, configured to:
receive the first type of vehicle information and the second type of vehicle information extracted from the image by the image processing unit; and transmit the first type of vehicle information and the second type of vehicle information to a vehicle data collection system.

17. The system of claim 16, wherein:
the telematics system is configured to collect additional vehicle information through a conventional telematics data pathway;
the image processing unit is configured to determine whether a trigger condition in the additional vehicle information collected through the conventional telematics data pathway is satisfied; and
the image processing unit is configured to, in response to satisfaction of the trigger condition, cause the camera to capture an image of the field of interest, and cause an image processing model to extract vehicle information from the image.

18. The system of claim 16, wherein:
the image processing unit is configured to determine whether a trigger condition in the first or second type of vehicle information extracted by the first or second image processing model is satisfied; and
in response to satisfaction of the trigger condition, the image processing unit is configured to cause the telematics system to collect additional vehicle information through a conventional telematics data pathway.

19. The system of claim 16, wherein the telematics system is coupled to the vehicle and/or integrated into the vehicle.

20. A non-transitory machine-readable storage medium comprising programming instructions that when executed cause a processor to:
identify a plurality of regions of interest in an image, captured by a camera located in a vehicle and pointed toward a field of interest in the vehicle, that are each expected to convey a type of vehicle information relating to an operating status of the vehicle, the plurality of regions of interest comprising a first region of interest that is expected to convey a first type of vehicle information relating to a first type of operating status of the vehicle and a second region of interest that is expected to convey a second type of vehicle information relating to a second type of operating status of the vehicle, the second type of vehicle information being different from the first type of vehicle information;
run a first image processing model over the first region of interest to extract the first type of vehicle information from the image, wherein:
the first image processing model is associated with a first set of image capture instructions indicating how the camera is to capture one or more images of the first region of interest for processing by the first image processing model, and
running the first image processing model comprises extracting, from the image, the first type of vehicle information relating to the first type of operating status of the vehicle; and
run a second image processing model over the second region of interest to extract the second type of vehicle information from the image, wherein:
the second image processing model is associated with a second set of image capture instructions indicating how the camera is to capture one or more images of the second region of interest for processing by the second image processing model, the second set of image capture instructions being different from the first set of image capture instructions, and
running the second image processing model comprises extracting, from the image, the second type of vehicle information relating to the second type of operating status of the vehicle.

\* \* \* \* \*